Feb. 23, 1960 W. D. GABOR 2,926,311

VARIABLE FREQUENCY SIGNAL GENERATOR

Filed Jan. 19, 1955

INVENTOR.
WILLIAM D. GABOR
BY
Curtis Morris & Safford
ATTORNEYS

United States Patent Office 2,926,311

Patented Feb. 23, 1960

2,926,311

VARIABLE FREQUENCY SIGNAL GENERATOR

William D. Gabor, Norwalk, Conn., assignor to C. G. S. Laboratories, Inc., Stamford, Conn., a corporation of Connecticut Application January 19, 1955, Serial No. 482,746

12 Claims. (Cl. 331—16)

This invention relates to variable frequency signal generators, and more particularly to the stabilization of variable-frequency generators capable of being varied over wide ranges of frequency.

It is possible, by the use of techniques and apparatus already known, to build highly stable oscillators whose frequency can be varied over a relatively limited range, for example 1.2 or 1.5 to one. The problem of stability, however, becomes increasingly troublesome as the operating range is increased in frequency.

One useful device for obtaining the wide variation in frequency includes as part of the tuning circuit inductances wound on ferrite core material. Such a tuning system is described by Dewitz in U.S. Patent application Serial No. 213,548, filed March 2, 1951. However, this core material is sensitive to variations in temperature and exhibits substantial hysteresis effects. This latter characteristic causes the inductance of a winding wound on such a core to be a function of the past magnetic history.

The present invention is described as embodied in apparatus in which the frequency of a wide-range oscillator is controlled from a stable narrow-band oscillator. A discriminator is employed in the output circuit of the narrow-band oscillator, and a feed-back circuit is arranged so that the discriminator null point follows the output frequency of this oscillator. A saturable reactor type tuning system of the wide-band oscillator is controlled with the discriminator in such a way that changes in the discriminator null point control the output frequency of this latter oscillator. The feed-back control system eliminates instability introduced by the ferrite core of the saturable reactor.

Figures 1, 2, 3:
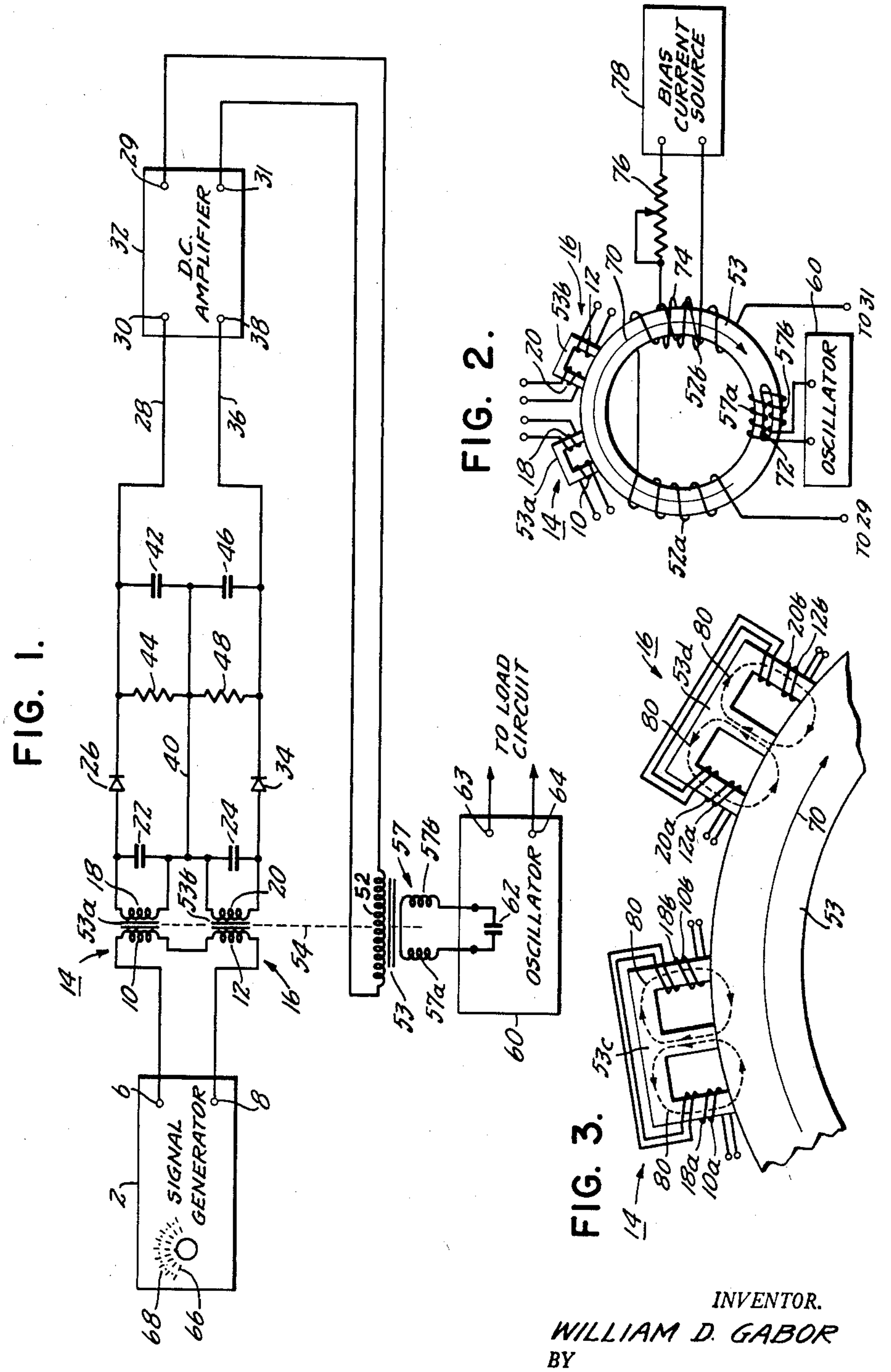
Figure 1 shows diagrammatically a variable-frequency signal generator embodying the invention.
Figure 2 illustrates the construction of a controllable inductor for use in the apparatus of Figure 1.
Figure 3 is an enlarged partial view of a modified form of controllable inductor suitable for use in the apparatus of Figure 1.

A narrow-band precision oscillator 2, which may be of any of the well-known types such as a Wien bridge oscillator, has a tuning knob 4 which may be manually operated, motor driven, or otherwise externally controlled to set the frequency of operation of the oscillator 2. The frequency range of this oscillator is selected for the particular application and may, for example, be variable from 100 to 130 kilocycles.

Two output terminals 6 and 8 of the highly-stable oscillator 2 are connected in series with windings 10 and 12 of two special transformers 14 and 16. The secondary windings 18 and 20 of these transformers are connected in parallel, respectively, with two capacitors 22 and 24 to form two resonant tank circuits of a stagger-tuned discriminator. The values of these elements are chosen so that the resonant frequency of the tank circuits are, respectively, slightly above and below the nominal operating frequency or discriminator null point.

One end of the secondary winding 18 of the transformer 14 is connected through a half-wave rectifier 26 and a lead 28 to an input terminal 30 of a direct current amplifier 32.

One end of the secondary winding 20 is connected, in a similar manner, through a half-wave rectifier 34 and a lead 36 to the other input terminal 38 of the amplifier 32.

The other ends of these windings 18 and 20 are connected together and to a lead 40. In order to filter the pulsating direct current from the rectifier 26, a capacitor 42 and a resistor 44 are connected in parallel and between the leads 28 and 40. The current from the rectifier 34 is filtered in a similar manner by a parallel combination of a capacitor 46 and a resistor 48 connected between the leads 36 and 40.

The direct voltages developed across the load resistors 44 and 48 are in opposition and, because the values of the circuit elements in the two halves of the discriminator circuit are equal, no voltage is applied to the amplifier terminals 30 and 38 when the frequency of the signal from the oscillator 2 is at the center frequency of the discriminator.

The direct-current amplifier 32 may be any one of the well-known types, such as one using vacuum tubes, transistors, magnetic devices or the like. The output of this amplifier is connected by two leads 50 and 51 to a control winding 52 which is wound on an annular core 53 (see also Figure 2) of saturable ferrite material. Changes in current output of the amplifier 32, therefore, control the magnetic permeability of the core 53.

The flux paths of transformers 14 and 16 are magnetically associated with and controlled by the core 53, as indicated by the broken line 54. One manner in which this relationship can be arranged is shown in Figure 2 where transformers 14 and 16 are shown as having generally U-shaped cores 53*a* and 53*b*, respectively, with their open ends located adjacent, and preferably in integral contact with, the core 53. Because the flux paths of the transformers 14 and 16 are completed through the core 53, any changes in the permeability of the core 53 will also change the effective inductance of the windings 18 and 20.

Also magnetically coupled to core 53 is a signal winding 57, shown connected to a variable-frequency wide-range oscillator 60. A capacitor 62 is connected in parallel with the signal winding 57 to form a frequency-selective circuit that controls the frequency of the signal produced by the oscillator 60. The remainder of the circuitry of oscillator 60 may be similar to any of the types well known in the art, and output terminals 63 and 64 are shown merely to indicate that a load can be connected to the output of the oscillator.

In operation, the discriminator circuit is tuned to a null point at about the center of the frequency range of the narrow-range oscillator 2, for the condition when the input voltage to the amplifier 32 is zero. This condition results in a predetermined current flowing through the control winding 52, which in turn sets the inductance of the winding 57 at a particular value. Correspondingly, the output frequency of the oscillator 60 is set at a particular value, which will normally be midway in the range of output frequencies available from this oscillator.

If, due to temperature fluctuations or otherwise, there is a variation in the permeability of the core 53, there would normally be an accompanying shift in the output frequency of the oscillator 60. However, this same change in permeability will alter the inductances of the windings 18 and 20 in such a way that the null point of the discriminator shifts from its original frequency. Since the output frequency of the oscillator 2 has not changed, there will be a resultant direct current potential at the output of the discriminator that is, between the leads 28 and 36. This potential is amplified by the amplifier 32, resulting in a variation in the current through the control winding 52. The direction of this current variation is such as to oppose the original fluctuation in permeability, and acts to restore the original magnetic condition of the core material. Therefore, the discriminator null point is reset to the frequency of the oscillator 2, and the output frequency of the oscillator 60 is stabilized by the feed-back circuit which includes the discriminator and the amplifier.

If the output frequency of the oscillator 2 is varied, the discriminator circuit will again produce a direct current potential, which will be passed on by the amplifier 32 as a current variation in the control winding 52. This current variation will change the permeability of core 53, and hence change the inductance of the windings 18 and 20. This change will continue until the discriminator null point has been reset at the new output frequency of oscillator 2, and until the input voltage on the terminals 30 and 38 of the amplifier 32 has been reduced nearly to zero.

With this change in current through the winding 52, the inductance of the signal winding 57 also changes, because of the saturation characteristics of the core 53. Therefore, the output frequency of the oscillator 60 will vary in accordance with the inductance change. Because the inductance of such a saturable core device can be controllably varied over an extremely wide range, the output frequency of oscillator 60 can be caused to cover a very broad band by varying the output frequency of oscillator 2 over a relatively narrow band.

The effectiveness of the stabilization system extends to any drift effects in the direct current amplifier 32. For example, if, because of changes in the emission of a vacuum tube in the amplifier 32, the output current through the winding 52 varies from its proper value, the immediate result will be a change in the tuning of the discriminator null point. When this occurs, the discriminator will produce a direct current output voltage, since the frequency of the oscillator 2 will no longer be on the null point. This output voltage will reset the output current passing through the winding 52 back towards its original value and thereby stabilize the system.

The degree of stabilization is a function of feed-back gain around the loop including the discriminator, the amplifier 32, and the winding 52. This gain can be made sufficiently high to provide a significant improvement in the frequency stability of a wide range oscillator.

In circuits where the signal generator 2 is either manually or motor controlled, and the knob 4 or similar indicator is used, an inner scale 66 may be associated with a pointer on the knob, with graduations indicating the frequency of the generator 2, i.e., in the present case from 100 to 130 kilocycles. Around the scale 66 may be another calibrated scale 68 which indicates the actual frequency of the oscillator 60 corresponding to each position of the knob 4.

As shown in Figure 2, the control winding 52 may be divided into two portions 52*a* and 52*b* connected in series so that their magnetomotive forces are additive in the core 53, so as to produce a control flux flowing completely around the core 53 as indicated by the arrow 70. Alternatively, the control winding can be a single winding, depending upon the configuration of the core 53.

The signal winding 57 preferably is divided into two portions 57*a* and 57*b* which are wound around opposite edge portions of the core 53 and through a window or slot 72 formed in the core 53. The two halves 57*a* and 57*b* of the signal winding are connected in series with their turns arranged so that the alternating signal flux produced by the signals in the winding 57 travel around the slot and do not magnetically couple with the control winding 52. Thus, the inductance of the signal winding 57 quickly follows changes in the magnitude of the control flux 70 due to changes in the control current in the control winding 52 but otherwise the signal winding is isolated from the control winding.

The cores 53*a* and 53*b* of the transformers 14 and 16 should be formed of magnetically stable material so that the discriminator circuit is responsive only to changes in the control flux 70. These cores 53*a* and 53*b* may be formed of high "Q" powdered iron.

As described above, the D.C. amplifier 32 is arranged to produce a predetermined current in the control winding 52 when the generator 2 is tuned to the null point of the discriminator so that the input at terminals 30 and 38 of the amplifier is zero. When the frequency of the generator 2 is above the null point, the amplifier 32 tends to increase the control current above this predetermined value, and when the frequency of the generator 2 is below the null point, the amplifier 32 tends to decrease the control current.

Alternately, where the amplifier 32 produces an output current which is zero where the discriminator output is zero and reverses in response to a reversal of the discriminator output, then a source of bias magnetic flux may be used with the core 53. The bias source is shown here as a bias winding 74 connected through an adjustable resistor 76 to a bias current source 78. The bias flux is adjusted by resistor 76 to a value such as approximately to half saturate the ferrite material of the core 53. Then, the control flux 70 represents the net effect of the control and bias windings.

When the frequency of the generator 2 is above the null point, the control current acts in the same direction as the bias current so as to increase the flux 70. When the frequency of the generator 2 is below the null point, the control current acts to oppose part of the bias flux, reducing the control flux 70 from its mean value. The source of bias flux may be a permanent magnet associated with the core 53.

In the controllable inductor shown in Figure 3, the transformer 14 is arranged on an E-shaped core 53*c* of high "Q" powdered iron material. The winding 10 is split into two halves 10*a* and 10*b* wound on the two outside legs of the core 53*c* and connected in series. The winding 18 is similarly divided into windings 12*a* and 12*b*.

The transformer 16 has a similar E-shaped core 53*d* and its windings 12 and 20 are divided into windings 12*a* and 12*b* and 20*a* and 20*b*, respectively.

Among the advantages of this arrangement is that the transformers 14 and 16 sample the permeability of the core 53 without any net voltage being induced in their windings due to changes in the signal flux 70, for any voltages induced in the halves of their windings cancel each other out. Conversely, there is no net resultant flux induced in the core 53 by any currents flowing through the transformer windings.

As shown by the dotted arrows 80, the flux associated with the transformer windings is confined to the E-shaped cores 53*c* and 53*d* and to the portions of the ferrite core 53 immediately adjacent to them, thus not coupling with any other windings on the core 53.

Embodiments of the invention other than that shown in the drawings will be evident to those skilled in the art. For example, in some applications it is possible to dispense with the direct current amplifier 32 by using an alternating current power amplifier immediately following the oscillator 2. Also for applications requiring high rates of frequency variation, such as in sweep circuit, etc., a reactance tube or other device can be used with the oscillator 2 to control the output frequency in accordance with input voltages. These and other variations are possible within the scope of the invention.

Further information in connection with the construction of suitable types of saturable core devices can be obtained from the following copending applications, all in the name of Gerhard H. Dewitz: Serial No. 300,196, filed July 22, 1952, issued as Letters Patent No. 2,799,822, dated July 16, 1957, Serial No. 300,746, filed July 24, 1952, issued as Letters Patent No. 2,802,185, dated August 6, 1957 and Serial No. 310,341, filed September 18, 1952, Patent No. 2,886,789.

I claim:

1. A variable frequency signal source comprising a first source of variable frequency signals, a controllable circuit responsive to frequency and generating an electrical signal as a function of frequency and being coupled to said first source and including at least one electrically-controllable inductance element controlling the frequency response characteristics of said frequency-responsive circuit, amplification means coupled to the output of said frequency-responsive circuit, a second source of variable frequency signals including a second electrically-controllable inductance element, and circuit means coupling the output of said amplification means to each of said inductance elements for simultaneously controlling said inductance elements for controlling the frequency of the signals from said second source in accordance with the frequency response characteristics of said frequency-responsive circuit.

2. A variable frequency signal source comprising a controllable inductor having a core of magnetizable material, a control winding on said core for regulating the extent of magnetic saturation of said core, and first and second signal windings the effective inductance of which is controlled by the extent of magnetization of said core, a source of variable frequency signals coupled to said first signal winding, a discriminator circuit including said first signal winding as a frequency response controlling element thereof, a second source of variable frequency signals including as a frequency-controlling element thereof said second signal winding, rectifier means coupled to the output of said discriminator, and circuit means coupling the output of said rectifier means to said control winding for simultaneously controlling the inductance of said first and second signal windings for varying the frequency of the signals from said second source as a function of variations in the frequency response of said discriminator.

3. A variable frequency electrical system comprising a first oscillator, means for varying the frequency of the signal produced by said oscillator, a discriminator circuit of the null type having an adjustable null frequency coupled to the output of said oscillator and having electrically controllable null frequency determining means therein for determining the null frequency, said discriminator producing a signal as a function of the difference between said null frequency and the frequency of the signal from said oscillator, electrical means responsive to the signal delivered by said discriminator and connected to said electrically controllable null frequency determining means for varying the null frequency of said discriminator to coincide with the frequency of the signal delivered by said oscillator, and a second oscillator continuously under the control of said electrical means for changing the frequency of said second oscillator in accordance with changes in the null frequency of said discriminator, whereby said second oscillator is under the control of said first oscillator.

4. A variable frequency electrical system comprising a first oscillator, means for varying the frequency of the signal produced by said oscillator, a discriminator circuit coupled to the output of said oscillator, rectifier means coupled to the output of said discriminator circuit, an electrically controllable inductor having a signal winding forming part of said discriminator circuit and regulating the null frequency of said discriminator circuit as a function of its inductance, said inductor also having a control winding for regulating the inductance of said signal winding, said control winding being connected to said rectifier means and arranged to vary the null frequency of said discriminator to coincide with the frequency of the signal delivered by said oscillator, and a second oscillator under the control of said control winding for varying the frequency of said second oscillator as a function of variations in said null frequency, whereby said second oscillator is under the control of said first oscillator.

5. A variable frequency narrow-band oscillator, a wide-band oscillator variable over a frequency range substantially greater than said narrow-band oscillator, a frequency-control circuit forming part of said wide-band oscillator and including a controllable inductor having a first closed magnetizable core, and signal and control windings on said core, a variable-frequency discriminator having first and second tunable frequency-responsive circuits, each including an inductive winding respectively on second and third closed magnetizable cores at least one portion of which is formed by at least a portion of said first magnetizable core of said controllable inductor, a rectifier circuit connected to the output of said discriminator, and a circuit coupled from the output of said rectifier circuit to said control winding, whereby the null frequency of said discriminator is shifted to follow variations in the frequency of the narrow-band oscillator signals and corresponding but larger variations are produced in the frequency generated by said wide-band oscillator.

6. A narrow-band oscillator, a wide-band oscillator variable over a frequency range substantially greater than said narrow-band oscillator, a frequency-control circuit forming part of said wide-band oscillator and controlling its frequency and including a controllable inductor having a closed ferrite core, a signal winding on said core coupled into said frequency-control circuit, and a control winding on said core controlling the inductance of said signal winding, a variable-frequency discriminator having first and second tunable frequency-responsive circuits, each of said circuits including an inductive winding on a closed magnetizable core at least one portion of which is formed by at least a portion of said ferrite core of said controllable inductor, rectifier and filter circuits connected to the output of said discriminator, and a circuit coupled from the output of said filter circuit to said control winding, whereby the null frequency of said discriminator is shifted to follow variations in the frequency of the narrow-band oscillator signals and corresponding but larger variations are produced in the frequency generated by said wide-band oscillator.

7. A narrow-band oscillator, a wide-band oscillator variable over a frequency range substantially greater than said narrow-band oscillator, a frequency-control circuit forming part of said wide-band oscillator and including a controllable inductor having a signal core portion of magnetically permeable saturable material, a signal winding on said core portion, said signal winding being coupled into said frequency control circuit, and a control winding arranged to control the saturation of said core portion, first and second primary and first and second secondary windings wound on first and second transformer core portions, said primary windings each being connected to the output of said narrow-band oscillator, a variable-frequency discriminator having first and second tunable frequency-responsive circuits, said circuits including said first and second secondary windings, respectively, each of said transformer core portions being associated with at least a part of said signal core portion of said controllable inductor, rectifier and filter circuits connected to the output of said discriminator, and a feedback circuit coupled between the output of said filter circuit and said control winding, whereby the null frequency of said discriminator is shifted to follow variations in the frequency of the narrow-band oscillator signals and corresponding but larger variations are produced in the frequency generated by said wide-band oscillator.

8. An oscillator frequency control system including a source of variable-frequency signals, a rebalanceable discriminator circuit having a pair of output terminals, said discriminator circuit being coupled to said source, said discriminator circuit including an inductance winding having a magnetically saturable core portion associated therewith and regulating the effective inductance of said winding, the rebalance frequency of said discriminator circuit being controlled by said inductance winding, electromagnetic means varying the magnetic saturation of said core portion, circuit means connecting the output terminals of said rebalanceable discriminator to said electromagnetic means, and an oscillator circuit having a frequency-control circuit including a second inductance winding having a second magnetically saturable core portion whose magnetic saturation is also controlled by said electromagnetic means, whereby the output frequency of said oscillator is controlled by the frequency of the signals from said source.

9. An oscillator frequency control system including a source of variable frequency signals, a rebalanceable discriminator circuit including a first tuned circuit having an electrical output, an inductance winding coupled to said tuned circuit and controlling its tuned frequency, said inductance winding having a magnetically saturable core portion associated therewith and regulating the effective inductance of said winding, electromagnetic means varying the magnetic saturation of said core portion, electrical opposition means having an electrical output in opposition to the electrical output from said tuned circuit, circuit means combining said electrical outputs in opposition and being connected to said electromagnetic means and controlling the magnetic saturation of said core portion in accordance with the difference in said outputs, and an oscillator circuit having a frequency-control circuit including a second inductance winding having a second magnetically saturable core portion whose magnetic saturation is also controlled by said electromagnetic means, whereby the output frequency of said oscillator is controlled by the frequency of the signals from said source.

10. An oscillator frequency control circuit as claimed in claim 9 and wherein said electrical opposition means a second tuned circuit coupled to a third inductance winding having a magnetically saturable core portion whose saturation is also controlled by said electromagnetic means.

11. A variable frequency signal generating system comprising a source of alternating signals of variable frequency, a controllable discriminator circuit coupled to said source and responsive to the frequency of the alternating signals from said source and generating an electrical signal as a function of said frequency, electrical means coupled to the output of said controllable discriminator circuit and arranged to vary the frequency response characteristics of said controllable discriminator circuit as a function of said frequency, and a variable frequency signal generator having an electrically controlled tuning element for controlling the frequency of said signal generator, said tuning element being continuously under the control of said electrical means for controlling the frequency of said signal generator in accordance with variations in the frequency response characteristics of said controllable discriminator circuit.

12. A variable frequency signal generating circuit comprising a source of alternating signals of variable frequency, a controllable discriminator circuit of the null frequency type coupled thereto and responsive to the frequency of the signals from said source, said controllable discriminator circuit producing an electrical signal output as a function of the difference between said frequency and the null frequency of said controllable discriminator, electrical means coupled to the output of said controllable discriminator circuit and arranged to vary the null frequency of said controllable discriminator circuit for maintaining said null frequency equal to the frequency of the signals from said source, and a variable frequency signal generator having as the frequency-controlling element thereof an electrically-controllable inductor continuously under the control of said electrical means for controlling the frequency of said signal generator in accordance with the null frequency of said controllable discriminator.

References Cited in the file of this patent

UNITED STATES PATENTS

| | | |
|---|---|---|
| 1,328,797 | Alexanderson | Jan. 20, 1920 |
| 2,302,839 | Roberts | Nov. 24, 1942 |
| 2,353,511 | Short | July 11, 1944 |
| 2,415,469 | Webb | Feb. 11, 1947 |
| 2,464,193 | Wild | Mar. 8, 1949 |
| 2,569,309 | Hepp | Sept. 25, 1951 |
| 2,581,202 | Post | Jan. 1, 1952 |
| 2,600,288 | Zylstra | June 10, 1952 |
| 2,673,321 | Stimler | Mar. 23, 1954 |
| 2,714,187 | Goodrich | July 26, 1955 |
| 2,731,564 | Edlstein | Jan. 17, 1956 |
| 2,750,549 | Crenshaw | June 12, 1956 |
| 2,802,185 | Dewitz | Aug. 6, 1957 |

FOREIGN PATENTS

| | | |
|---|---|---|
| 134,903 | Australia | Oct. 26, 1949 |

OTHER REFERENCES

Article entitled "Tuning with a Rheostat," by Bouche, pages 13, 51. Radio-Craft July 1939.